(12) United States Patent
Zhang et al.

(10) Patent No.: US 12,534,476 B2
(45) Date of Patent: Jan. 27, 2026

(54) INTERMEDIATE FOR SYNTHESIZING CAMPTOTHECIN DERIVATIVE, PREPARATION METHOD THEREFOR, AND USE THEREOF

(71) Applicant: Shanghai Haoyuan Medchemexpress Co., Ltd., Shanghai (CN)

(72) Inventors: Hong Wei Zhang, Shanghai (CN); Da Ming Zhang, Shanghai (CN); Tao Ma, Shanghai (CN); Qi Wei Zhu, Shanghai (CN); Zhi Guo Zhou, Shanghai (CN); Kui Mei, Shanghai (CN); Bao Fu Zheng, Shanghai (CN); Qiang Gao, Shanghai (CN); Hai Ling Yuan, Shanghai (CN)

(73) Assignee: Shanghai Haoyuan Medchemexpress Co., Ltd., Shanghai (CN)

( * ) Notice: Subject to any disclaimer, the term of this patent is extended or adjusted under 35 U.S.C. 154(b) by 554 days.

(21) Appl. No.: 18/013,375

(22) PCT Filed: Oct. 21, 2020

(86) PCT No.: PCT/CN2020/122298
§ 371 (c)(1),
(2) Date: Dec. 28, 2022

(87) PCT Pub. No.: WO2022/000868
PCT Pub. Date: Jan. 6, 2022

(65) Prior Publication Data
US 2023/0257392 A1   Aug. 17, 2023

(30) Foreign Application Priority Data

Jun. 28, 2020 (CN) .......................... 202010593916.8

(51) Int. Cl.
C07D 491/22    (2006.01)
C07C 231/12    (2006.01)
C07C 233/25    (2006.01)

(52) U.S. Cl.
CPC .......... *C07D 491/22* (2013.01); *C07C 231/12* (2013.01); *C07C 233/25* (2013.01)

(58) Field of Classification Search
CPC .................................................. C07D 491/22
See application file for complete search history.

(56) References Cited

FOREIGN PATENT DOCUMENTS

| CN | 105367396 A | 3/2016 |
|---|---|---|
| CN | 111470998 A | 7/2020 |
| EP | 0495432 A1 | 7/1992 |
| WO | 2019044946 A1 | 3/2019 |
| WO | 2019149164 A1 | 8/2019 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Yu Organic & Biomolecular Chemistry (2015), 13(29), 7924-7927.*
Yu, Jiajia et al., "A facile and regioselective synthesis of 1-tetralones via silver-catalyzed ring expansion", Org. Biomol. Chem. (2015), vol. 13, pp. 7924-7927.
Mazumdar, Wrickban et al., "Rh2(II)-Catalyzed Ring Expansion of Cyclobutanol-Substituted Aryl Azides To Access Medium-Sized N-Heterocycles", J. Am. Chem. Soc (Feb. 23, 2017).
Magesh, Sadagopan et al., "Human sialidase inhibitors: Design, synthesis, and biological evaluation of 4-acetamido-5-acylamido-2-fluoro benzoic acids", Bioorganic & Medicinal Chemistry (2009), vol. 17, pp. 4595-4603.
Takeda, Akira, "Synthesis of Ring-Substituted N-Phenylglycines, Their Nitriles and Amides", Contribution From the Ohara Institute For Agricultural Biology, Okayama University (Aug. 26, 1955), vol. 22, pp. 1096-1100.
International Search Report dated Mar. 30, 2021 issued in PCT/CN2020/122298.
CN First Office Action dated Aug. 6, 2020 issued in CN 202010593916.8.
CN Second Office Action dated Aug. 21, 2020 issued in CN 202010593916.8.

* cited by examiner

*Primary Examiner* — Nizal S Chandrakumar
(74) *Attorney, Agent, or Firm* — Scully, Scott, Murphy & Presser, P.C.

(57) ABSTRACT

Provided are an intermediate for synthesizing a camptothecin derivative, a preparation method therefor, and the use thereof. An intermediate A can be obtained from 3-fluoro-4-methylaniline by means of acylation, bromination, and cross-coupling reactions. The intermediate A can be used for preparing an intermediate B to further prepare exatecan mesylate. The intermediate compound B can be obtained from the intermediate A by means of a rearrangement reaction, and exatecan mesylate can be obtained from the intermediate compound B by means of deprotection for acetamido and amino at the a site, a condensation reaction, and a hydrolysis reaction. The reaction starting materials have a low price, the reaction conditions of each step are moderate, the operation is simple, and the yield is high, such that the intermediate is suitable for industrial production.

17 Claims, No Drawings

INTERMEDIATE FOR SYNTHESIZING CAMPTOTHECIN DERIVATIVE, PREPARATION METHOD THEREFOR, AND USE THEREOF

The present application claims the priority of Chinese patent application No. 202010593916.8, filed on Jun. 28, 2020, titled "Intermediate for synthesizing camptothecin derivative, preparation method thereof, and use thereof", and the entire contents of which are incorporated into the present application by reference.

TECHNICAL FIELD

The present invention relates to the technical field of organic compound synthesis, in particular to an intermediate for synthesizing camptothecin derivative and preparation method of the intermediate thereof, and a method and use of the intermediate for synthesizing exatecan mesylate.

BACKGROUND ART

Exatecan is a DNA topoisomerase I inhibitor, chemical name: (1S,9S)-1-amino-9-ethyl-5-fluoro-2,3-dihydro-9-hydroxy-4-methyl-1H,12H-benzo[de]pyrano[3',4':6,7]indolizino[1,2-b]quinolin-10,13(9H,15H)-dione), it is a water soluble camptothecin derivative with excellent antitumor function. Unlike irinotecan currently used in clinical, exatecan does not require activation by enzyme.

Exatecan has a structure represented by the following formula:

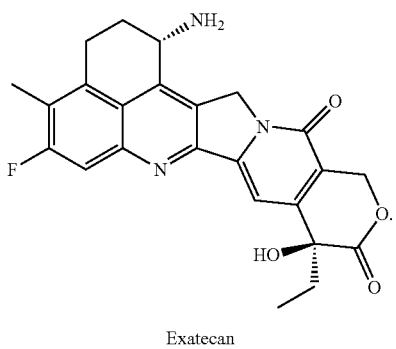 [SMILES: CC[C@@]1(O)C(=O)OCc2c1cc1n(c2=O)Cc2c-1nc1cc(F)c(C)c3c1c2[C@@H](N)CC3]

Exatecan

Exatecan compound and preparation method thereof are published in the EP0495432B1, wherein the synthetic route is as follows:

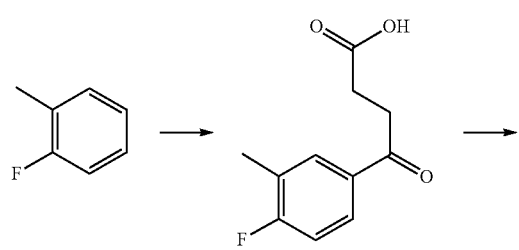

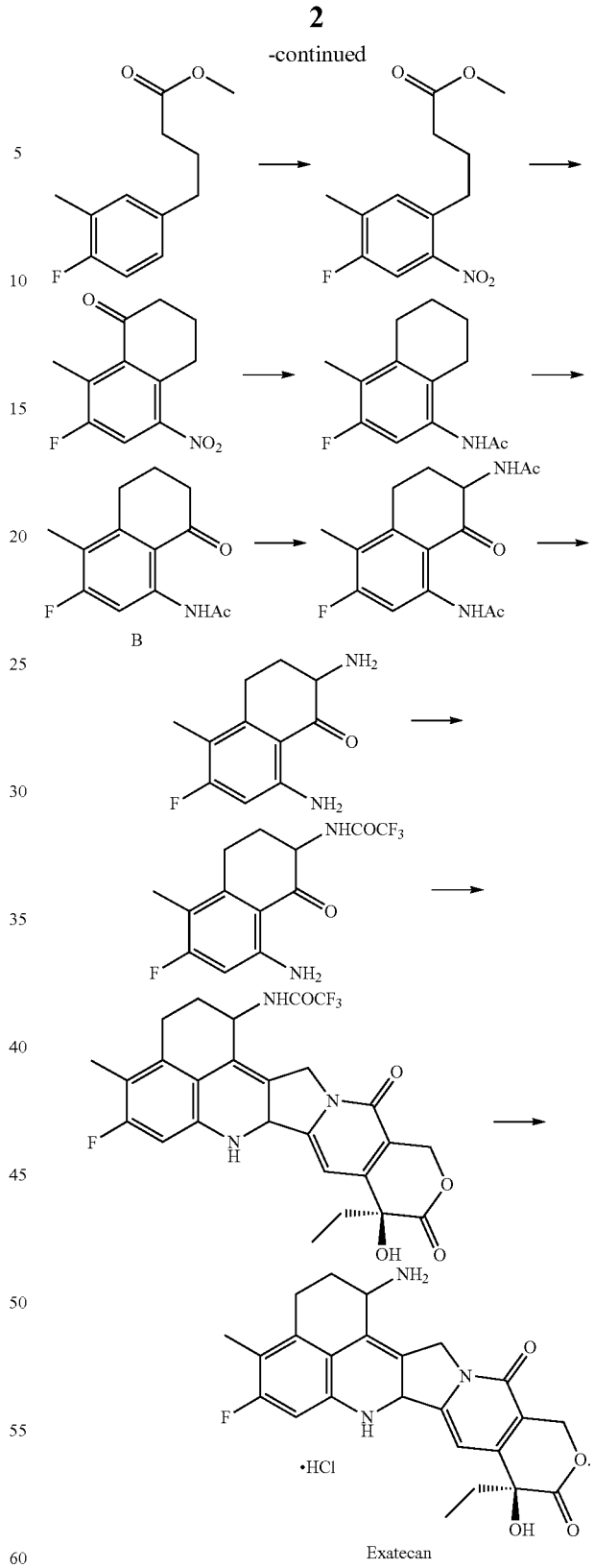

The synthesis of the aforementioned intermediate compound B go through a decarbonylation, then oxidizing oxidize to obtain the carbonyl compound by repeated reaction, the atom utilization rate is low and the yield is only 5.6%.

In addition, the exatecan hydrochloride is obtained from Compound B by means of deprotection for amino (acetyl group), and amino protection (trifluoroacetyl). The step is cumbersome and the atomic utilization rate is low, which is not conducive to the industrial scale-up production, and the yield is only 4.5%. The total yield of exatecan hydrochloride obtained from 2-Fluorotoluene through 11-steps reaction is only 0.25%.

Compound B as key intermediate for synthesis of exatecan, other known synthetic method is also published in the patent WO1996026181A1, the specific synthesis route is as follows:

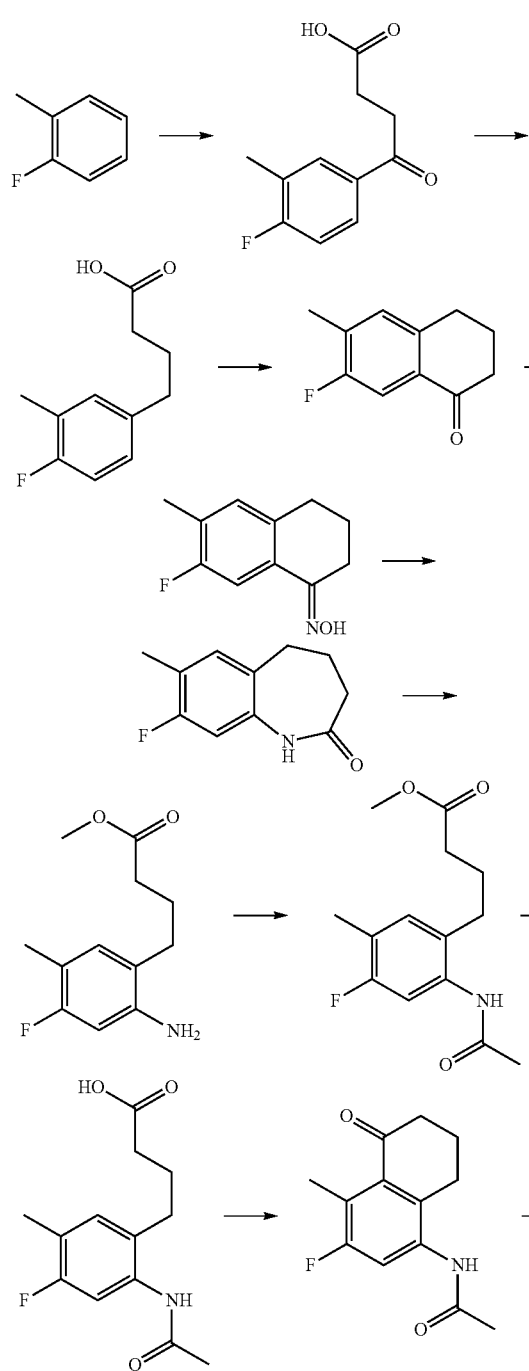

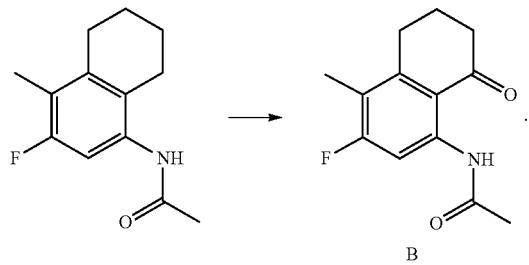

The method for synthesizing the aforementioned intermediate compound B, repeatedly performing ring closing, ring opening, oxidation and reduction reaction, having a long route and a complex reaction operation, is also not suitable for the industrial scale-up production.

In patent WO2019044946A1, synthesis of the intermediate compound B is optimized, Compound B and a synthesis method for preparing exatecan by Compound B is as follows:

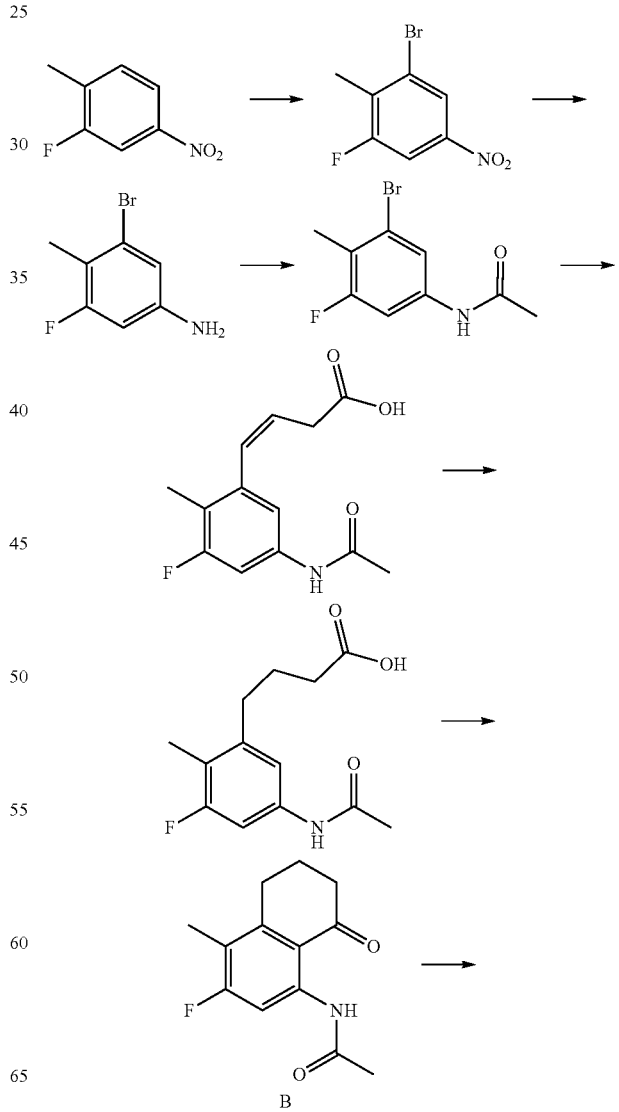

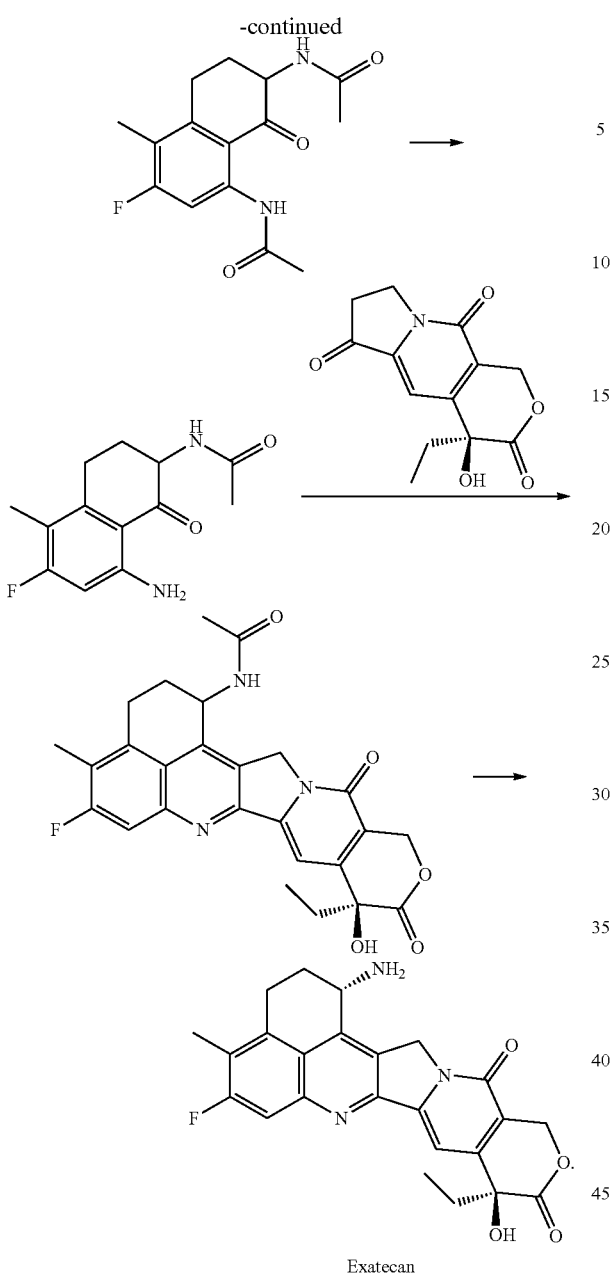

Exatecan

According to the aforementioned synthesis method, when preparing the intermediate compound B, in the step of reducing the nitro group to the amino group, the post-processing is complicated and the route is long, which is not conducive to industrial scale-up production.

In addition, in the step of synthesizing exatecan by Compound B, when performing an acetylamino reaction on Compound B, the condition of pressurizing hydrogenation reduction is needed, and the high-toxic o-cresol is used in a condensation reaction, which is a certain risk in the scale-up, and preparing exatecan from 2-fluoro-1-methyl-4-nitrobenzene through 10 steps, the total yield is 5.3%.

Therefore, we urgently need to develop a high yield, simple operation, low cost, and new process, which is suitable for industrial production of exatecan.

Based on the aforementioned descriptions, the present invention is specially provided.

SUMMARY OF INVENTION

The first object of the present invention is to provide a novel intermediate compound A, which can be used as a key intermediate for the synthesis of exatecan,

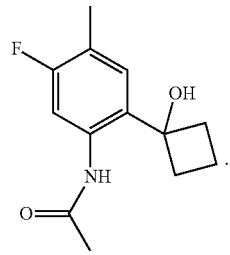

A

The second object of the present invention is to provide a preparation method of the intermediate compound A.

The third object of the present invention is to provide a method for preparing the key intermediate compound B of exatecan by using intermediate compound A,

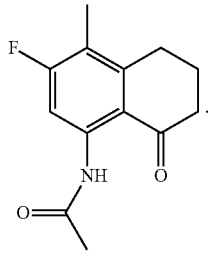

B

The fourth object of the present invention is to provide a method for preparing exatecan mesylate by using intermediate compound B.

The fifth object of the present invention is to provide a method for preparing exatecan mesylate by using intermediate compound A.

In order to achieve the aforementioned objects of the present invention, the following technical solutions are specially adopted.

For the second object of the present invention, which provides a preparation method of intermediate compound A, comprising the steps of:

a, subjecting Compound 1 to an acylation reaction with an acylating agent to obtain Compound 2;

b, subjecting Compound 2 to a bromination reaction with a brominating agent to obtain Compound 3;

c, subjecting Compound 3 to a cross-coupling reaction with cyclobutanone to obtain Compound A;

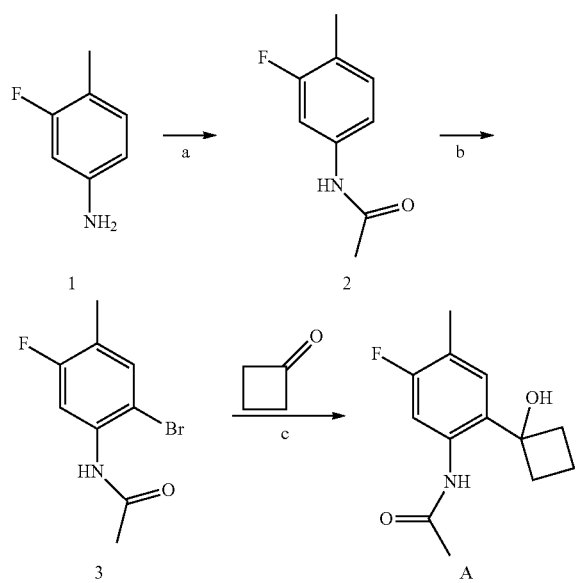

The method has the beneficial effects of low price starting material, simple synthetic route, high atomic utilization rate, easy operation, mild response conditions of each step, convenient post-processing, high production efficiency, and being suitable for the industrial scale-up production.

For the third object of the present invention, a preparation method of a key intermediate (Compound B) of exatecan by utilizing intermediate compound A is provided, comprising the step of:

d, subjecting Compound A to a rearrangement reaction to obtain Compound B;

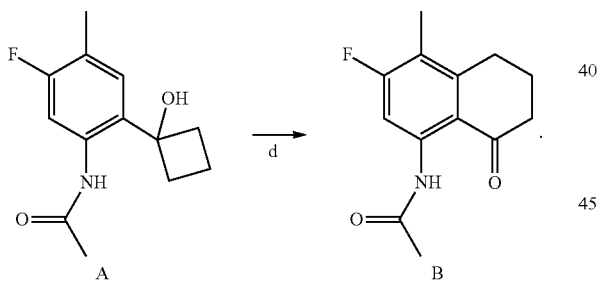

Therefore, in the method for preparing exatecan intermediate compound B of the invention, the 3-fluoro-4-methyl-aniline as starting material, through an acylation reaction, a bromination reaction and a cross-coupling reaction to obtain intermediate compound A, then Compound A through a rearrangement reaction to obtain exatecan intermediate B (N-(3-Fluoro-4-methyl-8-oxo-5,6,7,8-tetrahydro-1-naphthyl)acetamide).

In the aforementioned method for preparing exatecan key intermediate compound B by intermediate compound A, the starting materials are easily available, the synthesis route is simple, the reaction conditions are relatively mild, the post-processing is convenient, the atom utilization rate is high, and it can obtain high yield. The total yield of the intermediate B of exatecan can reach 54% through the 4 steps of step a to d.

Further, for the fourth object of the present invention, intermediate compound B prepared from intermediate compound A is used to prepare exatecan mesylate, and exatecan mesylate can be prepared from intermediate compound B, the preparation method comprises the steps of:

e, (i) reacting Compound B with an oximation agent, (ii) performing a catalytic hydrogenolysis reaction, (iii) protecting amino group with a protecting group to obtain Compound 4;

f, deprotecting an amino group in Compound 4 in the presence of an acid to obtain Compound 5;

g, subjecting Compound 5 to a condensation reaction with Compound 6 to obtain Compound 7;

h, subjecting Compound 7 to a hydrolysis reaction in the presence of an acid to obtain Compound 8 (exatecan mesylate);

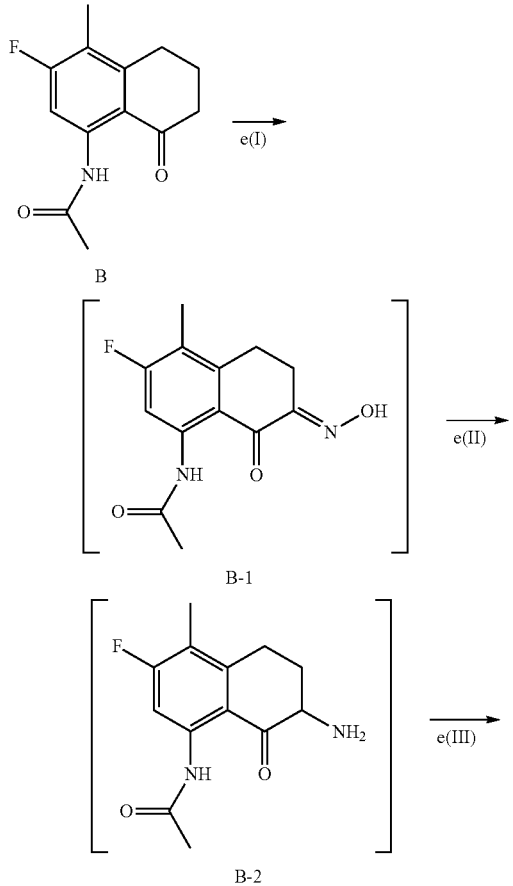

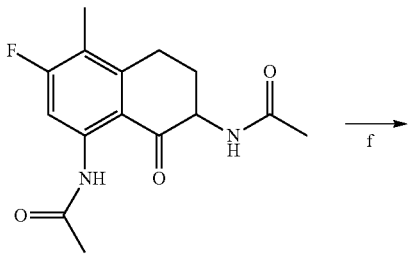

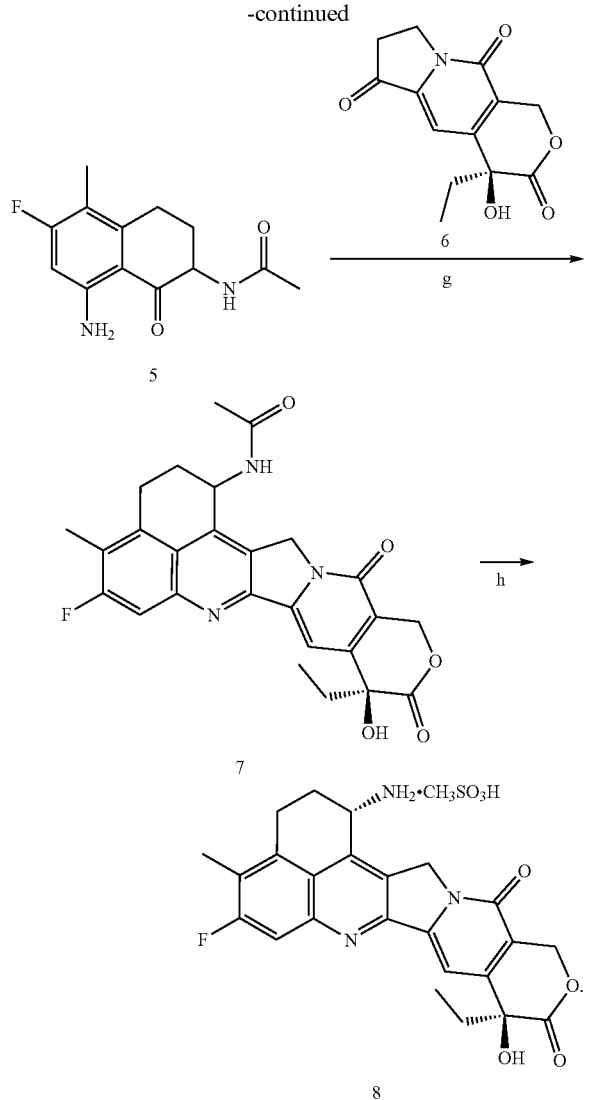

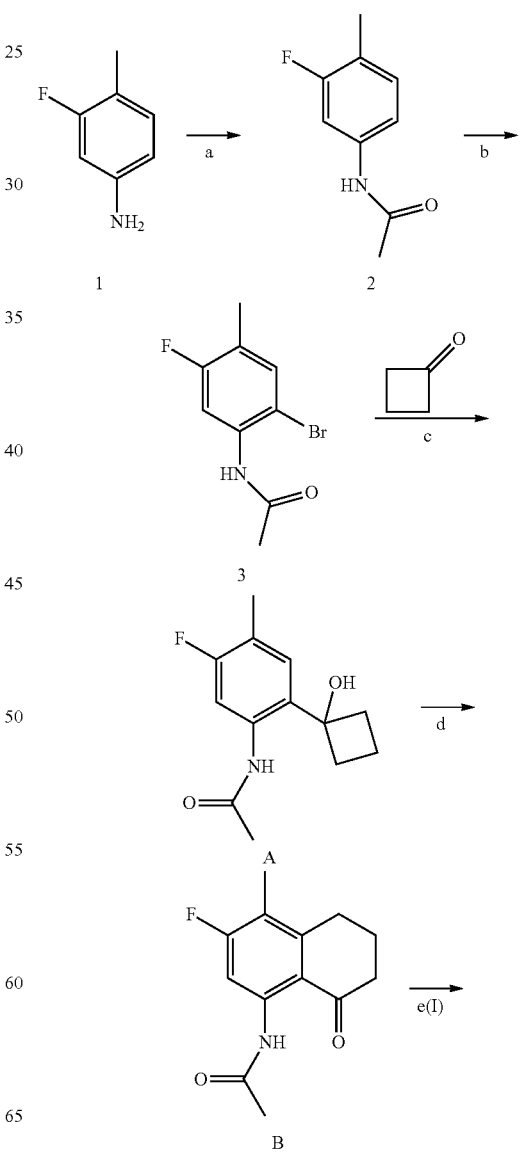

In addition, in step g, by adopting the condensation conditions of a reflux water separation, o-cresol with high toxicity in the prior art is avoided, so that the safety of the reaction is greatly improved.

And the aforementioned process can obtain high yield, the total yield of the intermediate B for preparing exatecan mesylate can reach 27.8% by step e to h of four-step reaction.

For the fifth object of the present invention, the preparation method for preparing exatecan mesylate from the intermediate compound A includes the aforementioned step d to h. In the method, the total yield of exatecan mesylate obtained by taking Compound A as a staring material can reach 22%.

For the fifth object of the present invention, the preparation method for preparing exatecan mesylate by taking Compound 1 as a starting material through intermediate compound A may include the aforementioned step a to h. In the method, the total yield of the exatecan mesylate obtained from Compound 1 can reach 15%.

Wherein, in the step e, steps (i), (ii) and (iii) may be performed as a "one-pot process". Step (ii) and step (iii) may also be performed sequentially. For example, the step (i) may be performed first, then step (ii), and finally step (iii). Alternatively, step (i) may also be performed first, then step (iii), and finally step (ii).

Therefore, in the preparation method of exatecan mesylate from intermediate compound B of the present invention, exatecan mesylate could be obtained by using Compound B, which performing an oximation, a reduction, an amino protection, an amino deprotection, a condensation and a hydrolysis reaction. These several steps of reactions are also conventional reaction types, the reaction conditions are relatively mild, the raw materials are easy to obtain, and the post-processing is simple and convenient. In particular, in step e, by using the route of an oximation, a reduction and an amino protection or an oximation, an amino protection and a reduction, a certain risk of high pressure hydrogenation conditions in prior art is avoided. In the method of the invention, the reduction process can be finished at a normal pressure, the safety is greatly improved, and it is good for the scale-up production of the product.

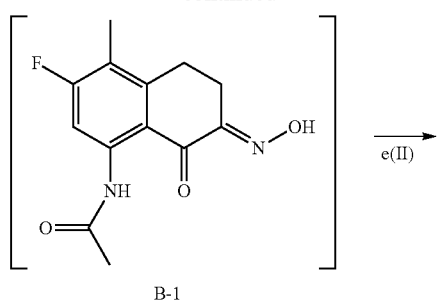

B-1

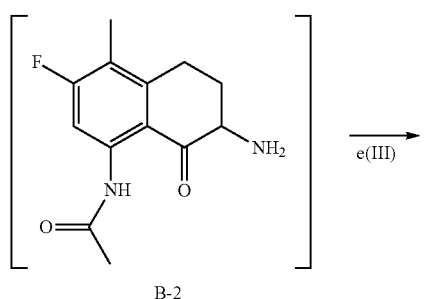

B-2

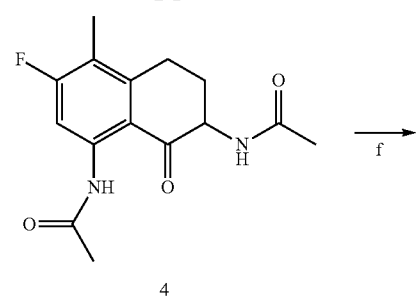

4

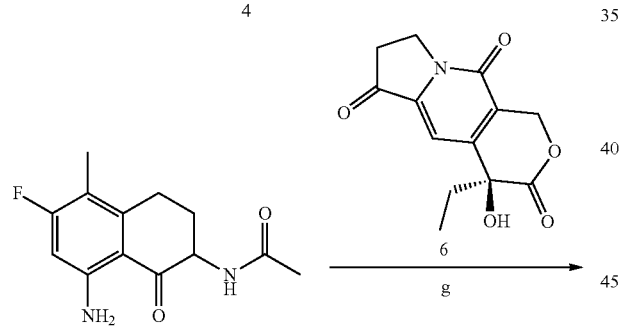

5

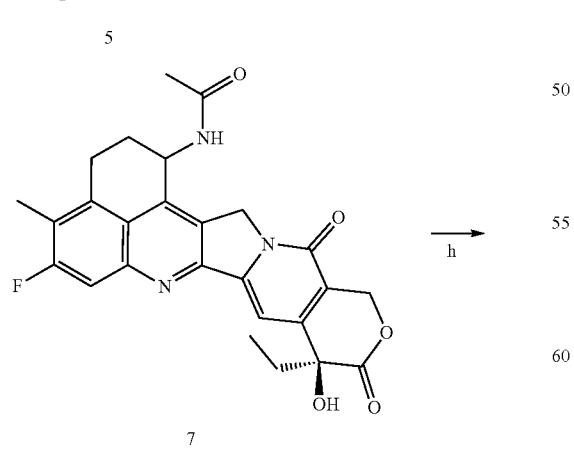

7

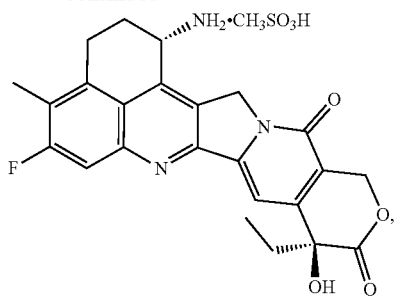

8 in each of the aforementioned methods, the following beneficial effects can be obtained: the reaction starting materials are low in price, simple in synthesis route, high in atom utilization rate, simple in operation, mild in each reaction condition, simple and convenient in post-processing, high production efficiency, and being suitable for the industrial scale-up production.

Wherein, the structural formula of each compound is as follows:

(1)

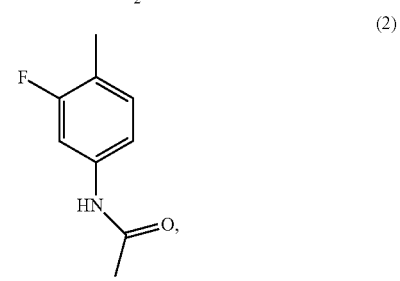

(2)

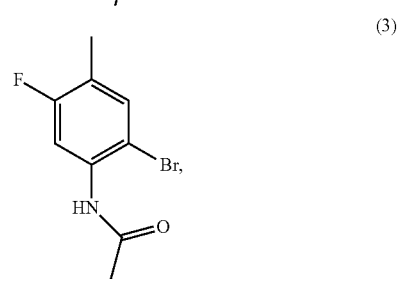

(3)

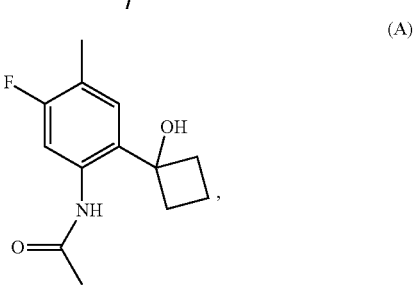

(A)

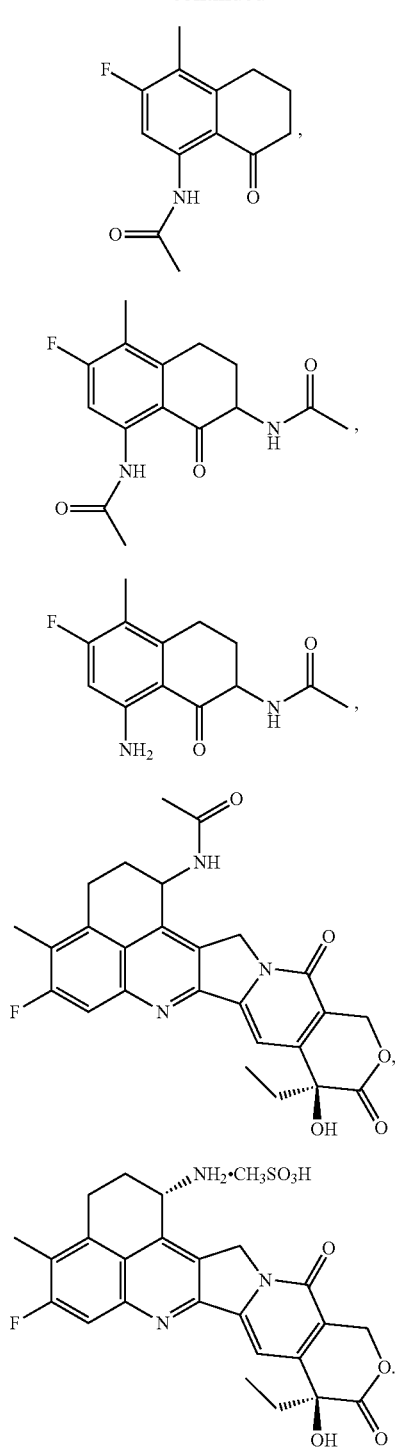

Preparing exatecan mesylate and intermediate A and B of exatecan through the aforementioned reaction, the reaction time of each step can adopt conventional monitoring means, such as using TLC monitoring reaction degree, selecting continuous reaction or ending reaction, and after the reaction, according to need to select whether to purify or directly carry out the next reaction and so on.

The reaction condition of each step can be conventional means, but adopting the following preferred solution can improve the product yield, at the same time, improve the reaction rate, and reduce the cost.

Preferably, in step a, subjecting Compound 1 to an acylation reaction with an acylating agent in the presence of a catalyst to obtain Compound 2.

Preferably, the acylating agent is one or more selected from acetic anhydride, acetyl chloride, ketene, chloroacetate and nitrile acetate, more preferably acetic anhydride or acetyl chloride.

Preferably, the catalyst is one or more selected from anhydrous aluminum chloride, anhydrous zinc chloride, polyphosphoric acid and sulfuric acid, more preferably anhydrous aluminum chloride or sulfuric acid.

The reaction temperature of step a is preferably −10~30° C., more preferably 0~10° C. The reaction time of step a is preferably 0.5~2 hours, more preferably 0.5~1 hour.

In step a, a mass ratio of Compound 1 to the acylating agent is preferably 1:(2~4).

Step a can adopt the following raw material adding order and reaction mode:
  mixing an acylating agent and a catalyst uniformly, cooling to 0~10° C., adding Compound 1 in batches, reacting for 0.5~1 h at 0~10° C. after the addition.

After the reaction, the reaction solution is poured into ice water, the solid is precipitated and the resulting mixture is filtered. The filter cake is washed with water, collected and dried to obtain Compound 2.

Preferably, in step b, subjecting Compound 2 to a bromination reaction with a brominating agent in the presence of a catalyst and an organic acid to obtain Compound 3.

Preferably, the brominating agent is one or more selected from liquid bromine, hydrogen bromide, phosphorus tribromide, aluminum tribromide and N-bromosuccinimide, preferably liquid bromine.

Preferably, the catalyst is one or more selected from magnesium bromide, zinc bromide, iodine, palladium acetate, sodium acetate, p-toluenesulfonic acid, copper trifluoromethanesulphonate and silver oxide, more preferably sodium acetate or iodine.

Preferably, the organic acid is one or more selected from formic acid, acetic acid, propionic acid, butyric acid and trifluoroacetic acid, more preferably acetic acid or trifluoroacetic acid.

The reaction temperature of step b is preferably 60~90° C., more preferably 80~90° C. The reaction time of step b is preferably 1-3 hours, more preferably 2-3 hours.

In step b, a molar ratio of Compound 2: the brominating agent:the catalyst is preferably 1:(1~2):(1~2), more preferably 1:(1~1.5):(1~1.5). A mass ratio of Compound 2 to the organic acid is preferably 1:(2~4).

Step b can adopt the following raw material adding order and reaction mode:
  adding Compound 2 and a catalyst to an organic acid, heating to 55~65° C., dropwise adding the organic acid mixed solution of a brominating agent, raising the temperature to 80~90° C., reacting for 2~3 hours.

After the reaction, cooled, the reaction solution is poured into ice water, the solid is precipitated and the resulting mixture is filtered. The filter cake is washed with water, collected and dried to obtain Compound 3.

Preferably, in step c, reacting Compound 3 with cyclobutanone in the presence of a base and an organic solvent A to obtain Compound A.

Preferably, the base is an organic strong base, preferably one or more of potassium tert-butoxide, sodium hydride, n-butyllithium and sodium methoxide, more preferably n-butyllithium, potassium tert-butoxide or sodium methoxide.

More preferably, n-butyllithium is the solution of an organic solvent B of n-butyllithium, preferably the organic solvent B is any one selected from tetrahydrofuran, dioxane and n-hexane, more preferably tetrahydrofuran.

Preferably, the organic solvent A is one or more selected from tetrahydrofuran, dioxane and n-hexane, more preferably tetrahydrofuran. The organic solvent A and B may be the same or different.

The mixing temperature of each reactant in step c is preferably −78~−50° C., more preferably −78~−65° C. The reaction temperature of step c is preferably 0~35° C., more preferably room temperature. The reaction time of step c is preferably 2~5 hours, more preferably 2~3 hours.

In step c, a molar ratio of Compound 3 to cyclobutanone is preferably 1:(1~3), more preferably 1:(1~2). A molar ratio of Compound 3 to the base is preferably 1:(1~3), more preferably 1:(2~3).

Step c can adopt the following raw material adding order:
dissolving Compound 3 in an organic solvent A, reducing to −78~−50° C., dropping a base, stirring for 1~2 hours, dripping cyclobutanone, stirring for 0.5~1 hour at −78~−50° C., recovering to room temperature and reacting for 0.5~1 hour.

After the reaction, the reaction mixture is quenched with an aqueous ammonium chloride solution, extracted with ethyl acetate. The organic layers are combined, washed with saturated brine, dried over anhydrous sodium sulfate, filtered, and spin-dried. The residue is recrystallized from an organic solvent C to obtain pure Compound A. The organic solvent C is one or more selected from methanol, ethanol, butanol and propylene glycol, preferably ethanol.

Preferably, in step d, reacting Compound A in the presence of a catalyst, an oxidant, water and an organic solvent D to obtain Compound B.

Preferably, the catalyst is one or more selected from copper powder, copper sulfate, cuprous chloride, cuprous bromide, cuprous iodide, silver nitrate, silver acetate and silver fluoride, preferably silver nitrate, silver fluoride or silver acetate.

Preferably, the oxidant is one or more selected from 1-chloromethyl-4-fluoro-1, 4-diazoniabicyclo[2.2.2]octane bis(tetrafluoroborate) (selectfluor), potassium persulfate and ceric ammonium nitrate, more preferably potassium persulfate or 1-chloromethyl-4-fluoro-1,4-diazoniabicyclo[2.2.2] octane bis(tetrafluoroborate).

Preferably, the organic solvent D is one or more selected from acetonitrile, dichloromethane, toluene, tetrahydrofuran and dimethyl sulfoxide, preferably acetonitrile.

The reaction temperature of step d is preferably 20~40° C., more preferably 25~35° C. The reaction time of step d is preferably 6~12 hours, more preferably 8~12 hours.

In step d, a molar ratio of Compound A to the catalyst is preferably 1:(0.1~0.5), more preferably 1:(0.2~0.3). A molar ratio of Compound A to the oxidant is preferably 1:(2~5), more preferably 1:(3~5).

In step d, a volume ratio of the organic solvent D to water is preferably 1:(0.9~2), more preferably 1:(1~1.5).

Step d can adopt the following raw material adding order:
dissolving Compound A in an organic solvent D and water, adding a catalyst and an oxidant, reacting for 8~12 hours at 25~35° C.

After the reaction, the product is dissolved in ethyl acetate, the mixture is filtered to remove inorganic salt, then the filtrate is extracted with ethyl acetate. The organic layers are combined, washed with saturated brine, dried over anhydrous sodium sulfate, filtered, spin dried and purified by column chromatography to obtain pure key intermediate compound B of exatecan.

Preferably, in step e, (i) reacting Compound B with an oximation agent in the presence of a base and an organic solvent E, (ii) performing a catalytic hydrogenolysis reaction in the presence of an acid, a catalyst, hydrogen and an organic solvent F, (iii) reacting with acetic anhydride to obtain Compound 4. Wherein steps (i), (ii) and (iii) may be performed as a "one-pot process". In addition, optionally, step (ii) and step (iii) may be performed sequentially in any order. For example, firstly performing step (i), then performing step (ii), at last performing step (iii). Alternatively, step (i) may be performed first, and then step (iii) is performed, and step (ii) is performed at last.

In step (i), the oximation agent is preferably a nitrite, such as amyl nitrite, n-butyl nitrite or tert-butyl nitrite, preferably n-butyl nitrite.

Preferably, the base is one or more selected from potassium tert-butoxide and sodium tert-butoxide, preferably potassium tert-butoxide.

Preferably, the organic solvent E is one or more selected from diethyl ether, tetrahydrofuran, 2-methyltetrahydrofuran, n-hexane, toluene, dioxane and tert-butanol, preferably the mixed solvent of tetrahydrofuran and tert-butanol.

The reaction temperature of step (i) is preferably −10~20° C., more preferably 0~5° C. The reaction time of step (i) is preferably 0.5~16 hours, more preferably 0.5~2 hours.

In step (i), a molar ratio of Compound B to the oximation agent is preferably 1:(1~2), more preferably 1:(1.2~1.6). A molar ratio of Compound B to the base is preferably 1:(1~3), more preferably 1:(1.5~2.5).

In step (ii), preferably, the acid is one or more selected from hydrochloric acid, acetic acid, methanesulfonic acid and hydrobromic acid, preferably hydrochloric acid, more preferably 2N dilute hydrochloric acid.

Preferably, the catalyst is one or more selected from palladium carbon, palladium hydroxide carbon, platinum carbon and zinc powder, preferably palladium carbon.

Preferably, the organic solvent F is one or more selected from ethyl acetate, methanol, ethanol and dichloromethane, preferably methanol.

The reaction temperature of step (ii) is preferably 5~35° C., more preferably 15~30° C. The reaction time of step (ii) is preferably 0.5~3 hours, more preferably 2~3 hours. The hydrogenolysis reaction of step (ii) is preferably a normal pressure reaction.

In step (ii), a molar ratio of Compound B to the acid is preferably 1:(1~3), more preferably 1:(1.5~2.5). A molar ratio of Compound B to the catalyst is preferably 1:(0.05~0.5), more preferably 1:(0.1~0.2).

The reaction temperature of step (iii) is preferably 5~35° C., more preferably 15~30° C. The reaction time of step (iii) is preferably 0.5~3 hours, more preferably 1~2 hours.

In step (iii), a molar ratio of Compound B to the acetic anhydride is preferably 1:(1~3), more preferably 1:(1.5~2.5).

Step e can adopt the following feeding order and post-processing mode:
adding a base to an organic solvent E, stirring to dissolve at 0~5° C., dropwise adding Compound B dissolved in an organic solvent E to the aforementioned reaction solution, and then dropwise adding an oximation agent, after the addition, reacting for 0.5~2 hours.

After the reaction, an acid is added to adjust the pH to acidity, then the mixture is extracted with ethyl acetate. The organic layer is washed with saturated brine, dried over anhydrous sodium sulfate, filtered, and concentrated. The crude product is slurried with methyl tert-butyl ether, filtered, and the solid is collected and dried.

The aforementioned solid is added to an organic solvent F, adding an acid, a catalyst and hydrogen at 10~25° C., performing a hydrogenation reaction at a normal pressure for 2~3 hours, after the reaction is finished, the reaction solution is directly used for the next reaction.

Adding acetic anhydride to the aforementioned reaction solution, and the reaction is continued for 1~2 hours under the protection of hydrogen.

After the reaction, the reaction mixture is neutralized with sodium bicarbonate to pH>7, then extracted with ethyl acetate. The organic layers are combined, washed with water, saturated brine, dried over anhydrous sodium sulfate, and concentrated. The crude product is slurried with mixed solvent of methyl tert-butyl ether and ethyl acetate, filtered and dried to obtain Compound 4.

Preferably, in step f, reacting Compound 4 in the presence of an acid and a solvent G to obtain Compound 5.

Preferably, the acid is one or more selected from hydrochloric acid, sulfuric acid and acetic acid, more preferably hydrochloric acid, even more preferably 2N dilute hydrochloric acid.

Preferably, the solvent G is one or more selected from water, methanol, ethanol and ethyl acetate, more preferably methanol.

The reaction temperature of step f is preferably 40~80° C., more preferably 60~70° C. The reaction time of step f is preferably 0.5~3 hours, more preferably 1~2 hours.

In step f, the concentration of Compound 4 in solvent G is 0.01~0.04 kg/L, more preferably 0.02~0.03 kg/L. A volume ratio of the solvent G to the acid is preferably 1:(0.7~1.5), more preferably 1:(0.9~1.2).

Step f can adopt the following raw material addition sequence:
adding Compound 4 to the solution of an acid and a solvent G, reacting at 60~70° C. for 1~2 hours under argon protection.

After the reaction, the mixture is cooled to 0~10° C., neutralized to pH=3~4 with saturated aqueous sodium bicarbonate, then neutralized to pH=6~7 with saturated sodium bicarbonate solution, filtered. The filter cake is washed with water, collected, and dried to obtain Compound 5.

Preferably, in step g, subjecting Compound 5 to a condensation reaction with Compound 6 in the presence of pyridinium p-toluenesulfonate and toluene to obtain Compound 7.

The reaction temperature of step g is preferably 110~150° C., more preferably 130~140° C. The reaction time of step g is preferably 24~72 hours, more preferably 30~50 hours. The reaction condition of step g is preferably a reflux reaction, more preferably a reflux water separation reaction, and more preferably a heating reflux water separation reaction.

In step g, a molar ratio of Compound 5 to Compound 6 is preferably 1:(0.9~1.2), more preferably 1:(1~1.1). A molar ratio of Compound 5 to pyridinium p-toluenesulfonate is preferably 1:(0.02~0.3), more preferably 1:(0.05~0.15).

Step g can adopt the following raw material addition sequence:
adding Compound 5, Compound 6 and pyridinium p-toluenesulfonate to a three-necked flask, followed by adding toluene, performing a reflux water separation reaction at 130~140° C. for 30~50 hours.

After the reaction, the reaction solution is cooled, filtered, washed with methyl tert-butyl ether, and the filter cake is collected and dried to obtain Compound 7.

Preferably, in step h, subjecting Compound 7 to a hydrolysis reaction in the presence of methanesulfonic acid and a solvent H to obtain Compound 8 (exatecan mesylate).

Preferably, the solvent H is one or more selected from water, 2-methoxyethanol and ethylcyclohexane, more preferably water.

The reaction temperature of step h is preferably 90~120° C., more preferably 100~115° C. The reaction time of step h is preferably 4~12 hours, more preferably 6~8 hours.

In step h, a mass ratio of Compound 7 to methanesulfonic acid is preferably 1:(3~30), more preferably 1:(15~30).

Step h can adopt the following raw material addition sequence:
Suspending Compound 7 in a solvent H, slowly adding methanesulfonic acid, the solid is dissolved and exothermic phenomenon occurs, after nitrogen replacement, the reaction is heated to 100~115° C. for 6~8 hours.

After the reaction, the reaction solution is cooled to room temperature and filtered. The filter cake is washed with water. The filtrate is diluted with ethanol, and the solid is precipitated, stirred, filtered, and drained at room temperature. Then the crude product is recrystallized from a mixed solution of ethanol and water to obtain Compound 8 (exatecan mesylate).

Compared with the prior art, the beneficial effects of the present invention are:
(1) the cost of starting materials is low;
(2) the synthesis route of the intermediate is simple, the operation is simple, the reaction condition in each step is mild;
(3) the post-processing is simple and convenient, and high productivity can be produced in industrial scale-up;
(4) exatecan mesylate of the present invention and its intermediates A and B have high overall synthetic yield.

DESCRIPTION OF EXAMPLES

The technical solutions of the invention will be clearly and completely described below in combination with the specific examples, those skilled in the art will understand that the examples described below are a part of the examples of the invention, and not exhaustive. Such examples are intended to illustrate the invention and not to limit the scope of the invention. All other examples obtained by those skilled in the art based on the examples of the invention without creative efforts fall within the scope of protection of the invention. Conditions not specifically specified in the examples are conventional conditions or the conditions recommended by the manufacturers. Reagents or instruments used whose manufacturers are not indicated are commercially available conventional products.

Some reagents adopted in the specific example of the present invention can be as follows:

| Reagent | Raw material supplier |
|---|---|
| 3-Fluoro-4-methylaniline | J&K Scientific |
| N-butyllithium | Jiangsu Changjili New Energy Technology Co., Ltd |
| Cyclobutanone | Chengdu Apis Pharmaceutical Technology Co., Ltd |

-continued

| Reagent | Raw material supplier |
|---|---|
| potassium persulfate | Wuhan Meng Qi Technology Co., Ltd. |
| Acetic acid | Jiangsu Bohan Industry Trade Co., Ltd. |

Example 1

Synthesis of Compound A

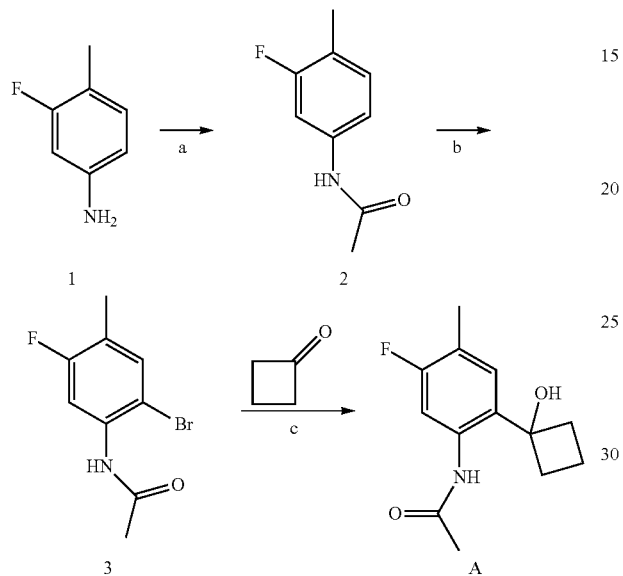

The synthetic route of Compound A of this example is shown aforementioned, and the preparation method comprises the steps of:
- a, acetic anhydride (300 mL) and sulfuric acid (1.5 mL) were added to a three-necked flask, and the temperature was cooled to 10° C. while stirring. Compound 1 (95 g) was added to the reaction flask in batches, after the addition, the mixture was stirred at 10° C. for 30 minutes. The reaction mixture was poured into ice water, then the solid was precipitated, filtered, washed with water three times, collected and dried to obtain the crude Compound 2 (117.8 g, 92.8%).
- b, Compound 2 (115.5 g) and sodium acetate (68 g) were added to acetic acid (250 mL), and heated to 60° C., followed by adding dropwise a mixture of bromine (132.5 g) and acetic acid (100 mL), the reaction temperature was raised to 80° C. and the mixture was stirred for 2 hours. After the reaction, the reaction mixture was poured into ice water, and a yellow solid was produced. The solid was filtered and washed with water three times to obtain Compound 3 as a white solid (167 g, 98%).
- c, Compound 3 (160 g) dissolved in tetrahydrofuran (1.5 L) was cooled to −78° C., and a solution of n-butyllithium in tetrahydrofuran (2.5 M, 0.624 L) was slowly dropped. After the mixture was stirred for one and a half hours, cyclobutanone (55 g) was slowly added dropwise, the reaction mixture was stirred at −78° C. for half an hour, and then the reaction temperature was restored to room temperature. Followed by stirring for a further half an hour, an aqueous ammonium chloride solution was added to quench the reaction. The solution was extracted with ethyl acetate (500 mL) three times. The organic layers were combined and washed once with saturated brine, dried with anhydrous sodium sulfate, filtered and spin-dried. The residue was recrystallized from two volumes of ethanol to obtain the pure Compound A (110.8 g, 72%).

Example 2

Synthesis of Compound A

The synthetic route of Compound A of this example is consistent with example 1, and the preparation method comprises the steps of:
- a, acetyl chloride (45 mL) and anhydrous aluminum chloride (5 g) were added to a three-necked flask, and the temperature was cooled to 0° C. while stirring. Compound 1 (20 g) was added to the reaction flask in batches, and after the addition, the mixture was stirred at 0° C. for 45 minutes. The reaction mixture was poured into ice water, then the solid was precipitated, filtered, washed with water three times, collected and dried to obtain the crude Compound 2 (24 g, 90%).
- b, Compound 2 (10 g) and iodine (15 g) were added to trifluoroacetic acid (15 mL), and heated to 55° C., followed by adding dropwise a mixture of liquid bromine (10.5 g) in trifluoroacetic acid (5 mL), the reaction temperature was raised to 85° C., and the mixture was stirred for 2 hours. After the reaction, the reaction mixture was poured into ice water, and a yellow solid was produced. The solid was filtered and washed with water three times to obtain Compound 3 as a white solid (14 g, 96%).
- c, Compound 3 (30 g) dissolved in n-hexane (300 mL) was cooled to −78° C., and potassium tert-butoxide (27 g) was slowly added to the reaction solution, stirred for one and a half hours, cyclobutanone (17 g) was slowly dropped, the reaction mixture was stirred at −78° C. for one and a half hours, and then the reaction temperature was restored to room temperature. Followed by stirring for a further an hour, an aqueous ammonium chloride solution was added to quench the reaction. The solution was extracted with ethyl acetate (100 mL) three times. The organic layers were combined and washed once with saturated brine, dried with anhydrous sodium sulfate, filtered and spin-dried. The residue was recrystallized from two volumes of ethanol to obtain the pure Compound A (20.2 g, 70%).

Example 3

Synthesis of Compound A

The synthetic route of Compound A of this example is consistent with example 1, and the preparation method comprises the steps of:
- a, acetic anhydride (9.2 L) and sulfuric acid (30 mL) were added to a three-necked flask, and the temperature was cooled to 5° C. while stirring. Compound 1 (2.5 kg) was added to the reaction flask in batches, and after the addition, the mixture was stirred at 5° C. for 60 minutes. The reaction mixture was poured into ice water, then the solid was precipitated, filtered, washed with water three times, collected and dried to obtain the crude Compound 2 (3.1 kg, 93%).
- b, Compound 2 (1.5 kg) and sodium acetate (770 g) were added to acetic acid (3.6 L), and heated to 60° C., and then a mixture of liquid bromine (1.5 kg) and acetic acid (1.4 L) was added dropwise to the reaction mixture. The reaction temperature was raised to 90° C., and stirred for 3 hours. After the reaction, the reaction mixture was poured into ice water, and a yellow solid was produced. The solid was filtered and washed with water three times to obtain Compound 3 as a white solid (2.16 kg, 98%).

c, Compound 3 (2 kg) dissolved in tetrahydrofuran (15 L) was cooled to −78° C., and a solution of n-butyllithium in tetrahydrofuran (2.5 M, 7.8 L) was slowly dropped. After the mixture was stirred for one and a half hours, cyclobutanone (687 g) was slowly dropped, the reaction mixture was stirred at −78° C. for one and a half hours, and then the reaction temperature was restored to room temperature. Followed by stirring for a further one and a half hours, an aqueous ammonium chloride solution was added to quench the reaction. The solution was extracted with ethyl acetate (5 L) three times. The organic layers were combined and washed once with saturated brine, dried with anhydrous sodium sulfate, filtered and spin-dried. The residue was recrystallized from two volumes of ethanol to obtain the pure Compound A (1.45 kg, 75%).

Example 4

Synthesis of Compound A

The synthetic route of Compound A of this example is consistent with example 1, and the preparation method comprises the steps of:

a, acetic anhydride (30 mL) was added to a three-necked flask, and the temperature was cooled to 10° C. while stirring. Compound 1 (10 g) was added to the reaction flask in batches, after the addition, the mixture was stirred at 10° C. for 30 minutes. The reaction mixture was poured into ice water, then the solid was precipitated, filtered, washed with water three times, collected and dried to obtain the crude Compound 2 (6 g, 45%).

b, Compound 2 (10 g) was added to acetic acid (20 mL), and heated to 60° C., followed by adding dropwise the mixture of liquid bromine (11.5 g) and acetic acid (10 mL), the reaction temperature was raised to 80° C., and stirred for 2 hours. After the reaction, the reaction mixture was poured into ice water, and a yellow solid was produced. The solid was filtered and washed with water three times to obtain Compound 3 as a white solid (11.7 g, 80%).

c, Compound 3 (10 g) was dissolved in dioxane (100 mL), and cooled to −78° C., and sodium methoxide (5.5 g) was slowly added, after the mixture was stirred for one and a half hours, cyclobutanone (3.5 g) was slowly dropped, the reaction mixture was stirred at −78° C. for half an hour, and then the reaction temperature was restored to room temperature. Followed by stirring for a further half an hour, an aqueous ammonium chloride solution was added to quench the reaction. The solution was extracted with ethyl acetate (50 mL) three times. The organic layers were combined and washed once with saturated brine, dried with anhydrous sodium sulfate, filtered and spin-dried. The residue was recrystallized from two volumes of ethanol to obtain the pure Compound A (6.3 g, 65%).

The compounds obtained in each step were routinely separated and purified, and the pure product was characterized. The structural characterization data were as follows:

Compound 2: $^1$H-NMR (CDCl$_3$) δ: 7.68 (1H, s), 7.43 (1H, d, J=12 Hz), 7.07-7.14 (2H, m), 2.26 (3H, s), 2.20 (3H, s); ESI-MS: m/z C$_9$H$_{10}$FNO [M+H]$^+$ Calculated: 168.1; Found: 168.1;

Compound 3: $^1$H-NMR (CDCl$_3$) δ: 8.18 (1H, d, J=12 Hz), 7.59 (1H, s), 7.37 (1H, d, J=8 Hz), 2.27 (3H, s), 2.26 (3H, s); ESI-MS: m/z C$_9$H$_9$BrFNO [M+H]$^+$ Calculated: 246.0/248.0; Found: 246.0/248.0;

Compound A: $^1$H-NMR (CD$_3$OD) δ: 7.68 (1H, d, J=12 Hz), 7.29 (1H, d, J=8 Hz), 2.52-2.56 (2H, m), 2.35-2.43 (2H, m), 2.29 (3H, s), 2.17 (3H, s), 2.02-2.06 (1H, m), 1.65-1.7 (1H, m); ESI-MS: m/z C$_{13}$H$_{16}$FNO$_2$ [M+H]$^+$ Calculated: 238.1; Found: 238.1.

Example 5

Synthesis of Compound B

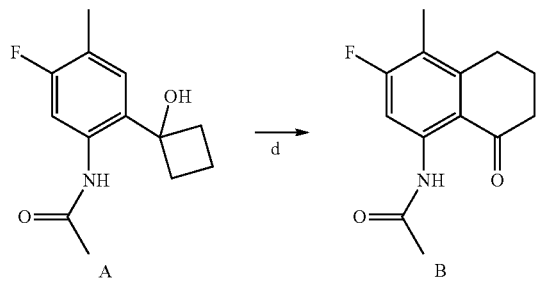

The synthetic route of Compound B of this example is shown above, and the preparation method comprises the step of:

d, Compound A (50 g) was dissolved in acetonitrile (750 mL) and water (750 mL), followed by adding silver nitrate (7.1 g) and potassium persulfate (170 g), while stirring at 30° C. for 8 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin dried and purified by column chromatography to obtain the pure key intermediate compound B of exatecan (33 g, 66%).

Example 6

Synthesis of Compound B

The synthetic route of Compound B of this example is consistent with example 5, and the preparation method comprises the step of:

d, Compound A (350 g) was dissolved in toluene (5.2 L) and water (6.2 L), followed by adding silver fluoride (46.8 g) and potassium persulfate (1.6 kg), while stirring at 25° C. for 10 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin-dried and purified by column chromatography to obtain the pure key intermediate compound B of exatecan (222 g, 64%).

Example 7

Synthesis of Compound B

The synthetic route of Compound B of this example is consistent with example 5, and the preparation method comprises the step of:
  d, Compound A (2.5 kg) was dissolved in dimethyl sulfoxide (25 L) and water (25 L), followed by adding silver nitrate (355 g) and potassium persulfate (8.5 kg), while stirring at 35° C. for 12 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin-dried and purified by column chromatography to obtain the pure key intermediate compound B of exatecan (1.96 kg, 79%).

Example 8

Synthesis of Compound B

The synthetic route of Compound B of this example is consistent with example 5, and the preparation method comprises the step of:
  d, Compound A (20 g) was dissolved in dichloromethane (300 mL) and water (300 mL), followed by adding silver nitrate (2.8 g) and potassium persulfate (68 g), while stirring at 30° C. for 8 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin-dried and purified by column chromatography to obtain the pure key intermediate compound B of exatecan (4.6 g, 23%).

Example 9

Synthesis of Compound B

The synthetic route of Compound B of this example is consistent with example 5, and the preparation method comprises the step of:
  d, Compound A (40 g) was dissolved in tetrahydrofuran (650 mL) and water (1 L), followed by adding silver acetate (8.4 g) and selectfluor (298 g), while stirring at 35° C. for 8 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin-dried and purified by column chromatography to obtain the pure key intermediate compound B of exatecan (23.8 g, 60%).

Example 10

Synthesis of Compound B

The synthetic route of Compound B of this example is consistent with example 5, and the preparation method comprises the step of:
  d, Compound A (35 g) was dissolved in dimethyl sulfoxide (520 mL) and water (520 mL), followed by adding silver fluoride (4.7 g) and potassium persulfate (160 g), while stirring at 30° C. for 10 hours. After the reaction, the product was dissolved in ethyl acetate, filtered to remove inorganic salts. The filtrate was extracted three times with ethyl acetate. The organic layers were combined and washed once with saturated brine, dried with anhydrous sodium sulfate, filtered, spin-dried and purified by column chromatography to obtain the pure key intermediate compound B of exatecan (24.3 g, 70%).

Compound B: $^1$H-NMR (CDCl$_3$) δ: 8.43 (1H, d, J=12 Hz), 2.88-2.91 (2H, m), 2.66-2.69 (2H, m), 2.24 (3H, s), 2.17 (3H, s), 2.09-2.12 (2H, m); ESI-MS: m/z C$_{13}$H$_{14}$FNO$_2$ [M+H]$^+$ Calculated: 236.1; Found: 236.1.

Example 11

Synthesis of Compound 8 (Exatecan Mesylate)

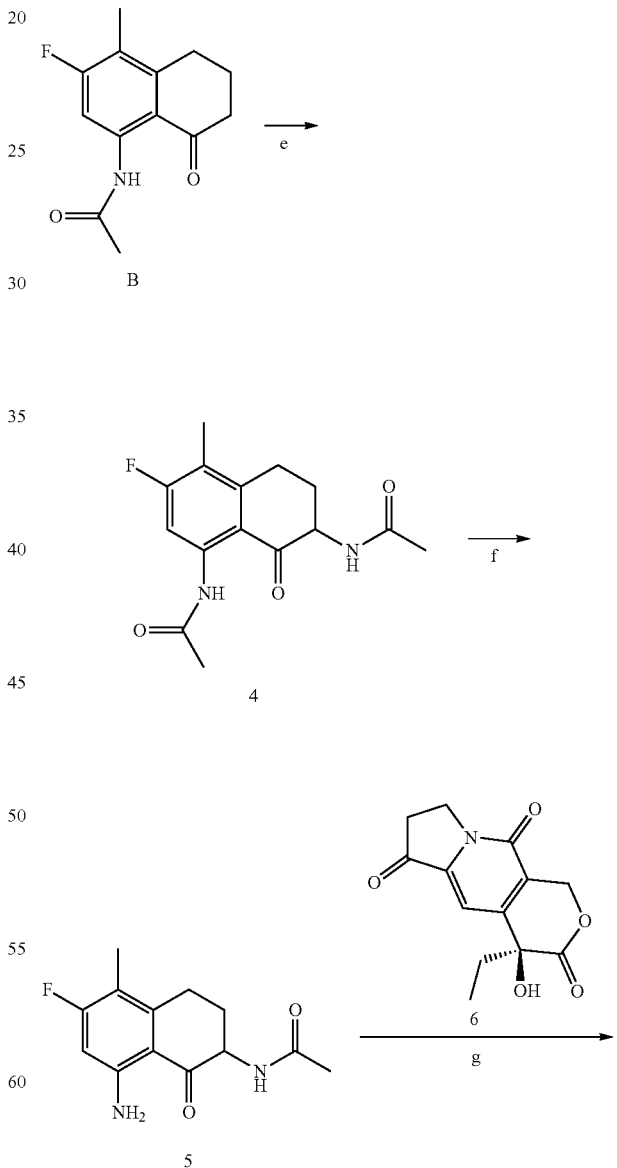

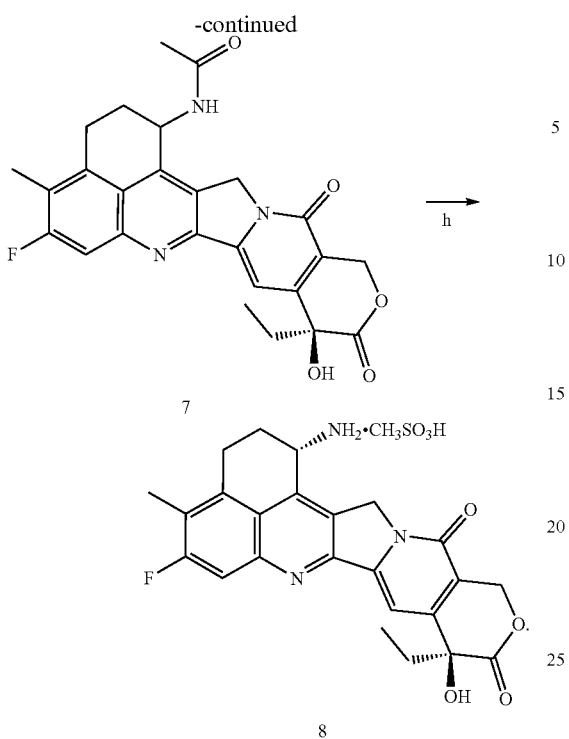

7

8

The synthetic route of Compound 8 of this example is shown above, and the preparation method comprises the steps of:

e, potassium tert-butoxide (34.6 g) was added to a mixture of tetrahydrofuran (650 mL) and tert-butanol (165 mL), dissolved at 5° C. while stirring to obtain the reaction mixture. Compound B (33.0 g) was dissolved in tetrahydrofuran (650 mL), and added dropwise to the reaction mixture, reacted for 10 min. Followed by adding dropwise n-butyl nitrite (23.2 g), the reaction was continued for an hour. The pH was adjusted to be acidic with 2N hydrochloric acid (360 mL), the mixture was extracted with ethyl acetate (1 L), the organic layer was washed with saturated brine, dried over anhydrous sodium sulfate, filtered and concentrated, and the crude product was slurried with methyl tert-butyl ether (200 mL), filtered and dried.

The aforementioned solid (27.5 g) was added to methanol (300 mL), followed by adding 2N hydrochloric acid (127 mL) and palladium carbon (3.3 g) at room temperature. The hydrogenation reaction was performed for 2 hours in a hydrogen stream under a normal pressure, and the reaction solution was directly used in the next step.

Acetic anhydride (33.0 g) was added to the aforementioned reaction solution, and the reaction was continued for an hour under the protection of hydrogen. After the reaction, the mixture was neutralized with sodium bicarbonate to pH>7, extracted with ethyl acetate (300 mL*2), washed with water, and washed with saturated brine, dried with anhydrous sodium sulfate, concentrated, and the crude product was slurried with a mixed solvent of methyl tert-butyl ether (100 mL) and ethyl acetate (50 mL), filtered and dried to obtain Compound 4 as a light yellow solid powder (25.6 g, 62%).

f, Compound 4 (15.5 g) was added to the solution of 2N hydrochloric acid (620 mL) and methanol (620 mL), and reacted at 60° C. for half an hour under argon protection. Then the mixture was cooled to 0~10° C., neutralized to pH=3-4 with sodium carbonate (65.7 g) and water (1314 mL), then neutralized to pH=6~7 with saturated aqueous sodium bicarbonate, filtered, washed with water (100 mL), and dried to obtain Compound 5 as a solid powder (12.4 g, 93%).

g, Compound 5 (10 g), Compound 6 (10 g) and pyridinium p-toluenesulfonate (6 g) were added to a three-necked flask, followed by adding toluene (500 mL), a reflux and water separation reaction is performed at 130~140° C. for 48 hours. The reaction mixture was cooled, filtered, washed with methyl tert-butyl ether (100 mL), and the solid was collected and dried to obtain Compound 7 (18.4 g, 96.5%).

h, Compound 7 (30 g) was suspended in the water (600 mL), the methanesulfonic acid (300 mL) was slowly added, there was an exothermic phenomenon during the solid was dissolved. After nitrogen replacement, the reaction was heated to 112° C. for 7 hours. After the reaction, the reaction mixture was cooled to room temperature and filtered. The filter cake was washed with water (100 mL). The filtrate was diluted with ethanol (4 L), then the solid was precipitated, stirred, filtered, and drained at room temperature. A suspension of the crude product in ethanol/water=4:1(1 L) was heated under reflux for 2 hours. Then the mixture was cooled to room temperature and filtered. The solid was washed with small amount of ethanol, drained, and freeze dried to obtain exatecan mesylate (Compound 8, 16.7 g, 50%).

Example 12

Synthesis of Compound 7

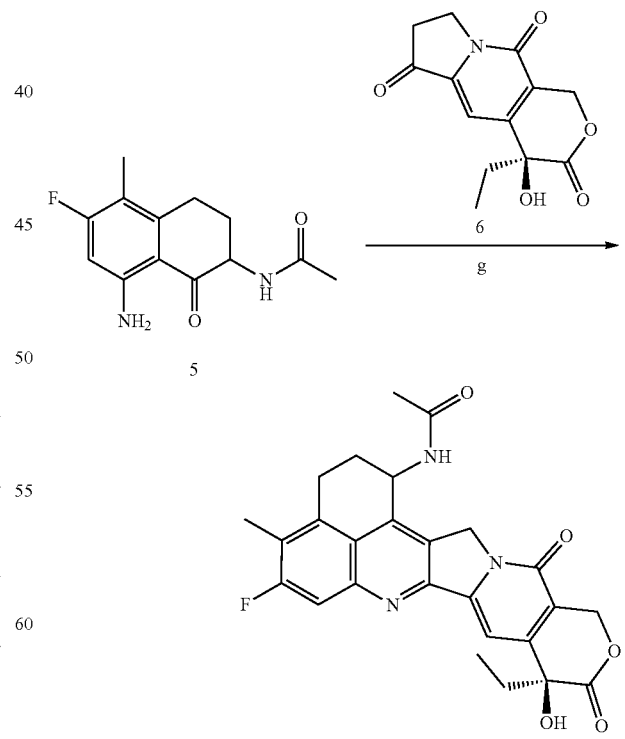

5

6

7

The synthetic route of Compound 7 of this example is shown above, and the preparation method comprises the step of:

g, Compound 5 (5 g), Compound 6 (5 g) and pyridinium p-toluenesulfonate (3 g) were added to a three-necked flask. After the addition of toluene (200 mL), a reflux and water separation reaction is performed at 130~140° C. for 72 hours. The reaction mixture was cooled, filtered, washed with methyl tert-butyl ether (50 mL), and the solid was collected and dried to obtain Compound 7 (6.4 g, 71%).

The compounds obtained in each step are routinely separated and purified, and the pure product is characterized. The structural characterization data are as follows:

Compound 4: $^1$H-NMR (DMSO-$d_6$) δ: 11.89 (s, 1H), 8.29 (d, J=13.0 Hz, 1H), 8.22 (d, J=7.8 Hz, 1H), 4.59-4.65 (m, 1H), 3.09-2.94 (m, 2H), 2.18-2.21 (m, 1H), 2.16 (s, 3H), 2.12 (s, 3H), 1.95-2.03 (m, 1H), 1.92 (s, 3H); ESI-MS: m/z $C_{15}H_{17}FN_2O_3$[M+H]$^+$ Calculated: 293.1; Found: 293.1;

Compound 5: $^1$H-NMR (DMSO-$d_6$) δ: 8.08 (d, J=7.9 Hz, 1H), 7.42 (s, 2H), 6.38 (d, J=12.5 Hz, 1H), 4.51-4.41 (m, 1H), 2.91-2.94 (m, 1H), 2.79-2.84 (m, 1H), 2.10-2.18 (m, 1H), 1.98 (s, 3H), 1.90 (s, 3H), 1.81-1.89 (m, 1H); ESI-MS: m/z $C_{13}H_{15}FN_2O_2$[M+H]$^+$ Calculated: 251.1; Found: 251.1;

Compound 7: $^1$H-NMR (DMSO-$d_6$) δ: 8.43-8.55 (m, 1H), 7.80 (d, J=10.9 Hz, 1H), 7.31 (d, J=3.8 Hz, 1H), 6.55 (s, 1H), 5.54-5.57 (m, 1H), 5.43 (s, 2H), 5.16-5.25 (m, 2H), 3.17 (s, 2H), 2.39 (s, 3H), 2.11-2.13 (m, 2H), 1.80-1.92 (m, 5H), 0.86-0.89 (m, 3H); ESI-MS: m/z $C_{26}H_{24}FN_3O_5$[M+H]$^+$ Calculated: 478.2; Found: 478.2;

Compound 8 (exatecan mesylate): $^1$H-NMR (D$_2$O) δ: 7.08 (d, J=10.3 Hz, 1H), 7.05 (s, 1H), 5.33-5.34 (m, 1H), 5.24-5.27 (m, 1H), 5.19-5.21 (m, 1H), 5.16-5.17 (m, 1H), 5.12 (s, 1H), 3.25 (d, J=13.4 Hz, 1H), 2.91-2.97 (m, 1H), 2.63-2.66 (m, 4H), 2.47-2.54 (m, 1H), 2.13 (s, 3H), 1.73-1.77 (m, 2H), 0.74 (t, J=7.3 Hz, 3H); ESI-MS: m/z $C_{25}H_{26}FN_3O_7S$ [M+H]$^+$ Calculated: 532.2; Found: 532.2.

INDUSTRIAL APPLICABILITY

In the present invention, the reaction starting materials have a low price, the synthesis route of the intermediate is simple, the reaction conditions of each step are moderate, the post-processing is easy and the yield is high. Therefore the present invention is suitable for industrial production.

Finally, it should be noted that the aforementioned examples are merely illustrative of the technical solutions of the present invention, and are not intended to limit the same. Although the present invention has been described in detail with reference to the foregoing examples, it should be understood by those of ordinary skill in the art that modification may be made to the technical solutions described in the foregoing examples, or equivalent replacement may be made to some or all of the technical features; however, the modifications or replacements do not make the essence of the corresponding technical solutions deviate from the scope of the technical solutions of various examples of the present invention.

The invention claimed is:

1. A preparation method of an intermediate compound represented by formula B, characterized by comprising the step of:

d, subjecting Compound A to a rearrangement reaction to obtain Compound B,

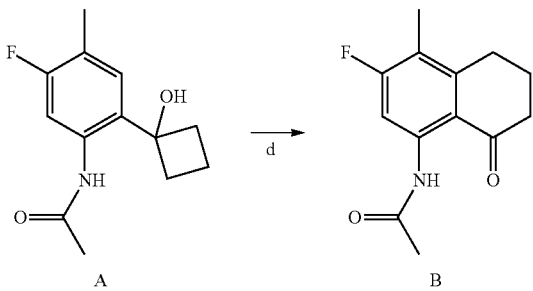

wherein said rearrangement reaction is conducted in the presence of a catalyst, an oxidant, water, and an organic solvent to obtain Compound B; and wherein said catalyst is one or more selected from silver nitrate, silver acetate, and silver fluoride; the oxidant is one or more selected from potassium persulfate, and the organic solvent is one or more selected from acetonitrile, dichloromethane, toluene, tetrahydrofuran, and dimethyl sulfoxide.

2. The preparation method according to claim 1, wherein Compound A is prepared by a method comprising the steps of:

a, subjecting Compound 1 to an acylation reaction with an acylating agent in the presence of a catalyst to obtain Compound 2;

b, subjecting Compound 2 to a bromination reaction with a brominating agent in the presence of a catalyst and an organic acid to obtain Compound 3;

c, subjecting Compound 3 to a cross-coupling reaction with cyclobutanone in the presence of a base and an organic solvent to obtain Compound A;

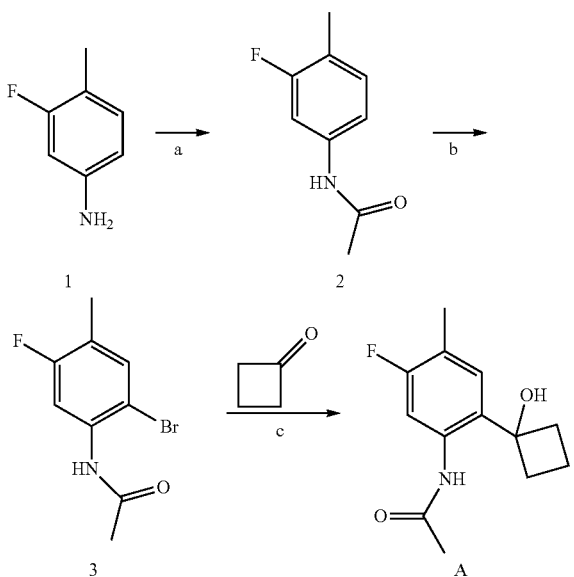

3. The preparation method according to claim 2, wherein in the step of a, the acylating agent is one or more selected from acetic anhydride, acetyl chloride, ketene, chloroacetate, and nitrile acetate; the catalyst is one or more selected from anhydrous aluminum chloride, anhydrous zinc chloride, polyphosphoric acid, and sulfuric acid.

4. The preparation method according to claim 2, wherein in the step of b, the brominating agent is one or more selected from liquid bromine, hydrogen bromide, phosphorus tribromide, aluminum tribromide and N-bromosuccinimide; the catalyst is one or more selected from magnesium bromide, zinc bromide, iodine, palladium acetate, sodium acetate, p-toluenesulfonic acid, copper trifluoromethanesulphonate and silver oxide; the organic acid is one or more selected from formic acid, acetic acid, propionic acid, butyric acid and trifluoroacetic acid.

5. The preparation method according to claim 2, wherein in the step of c, the base is one or more selected from potassium tert-butoxide, sodium hydrogen, n-butyllithium and sodium methoxide; the organic solvent is one or more selected from tetrahydrofuran, dioxane, and n-hexane.

6. The preparation method according to claim 4, characterized by further comprising the steps of:

e, (i) reacting Compound B with an oximation agent in the presence of a base, (ii) performing a catalytic hydrogenolysis reaction in the presence of an acid, a catalyst and hydrogen under a normal pressure condition, (iii) protecting amino group with a protecting group to obtain Compound 4; wherein (ii) and (iii) may be performed in an exchanged order, or may be performed as a "one-pot process";

f, deprotecting an amino group in Compound 4 in the presence of an acid to obtain Compound 5;

g, subjecting Compound 5 to a condensation reaction with Compound 6 to obtain Compound 7;

h, subjecting Compound 7 to a hydrolysis reaction in the presence of an acid to obtain exatecan mesylate of formula 8;

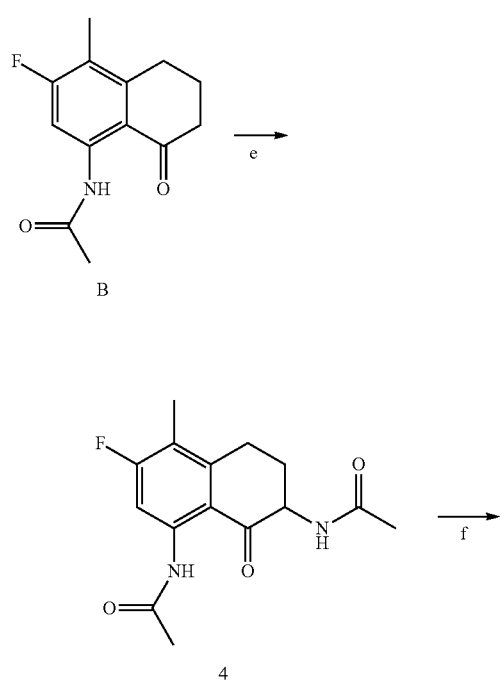

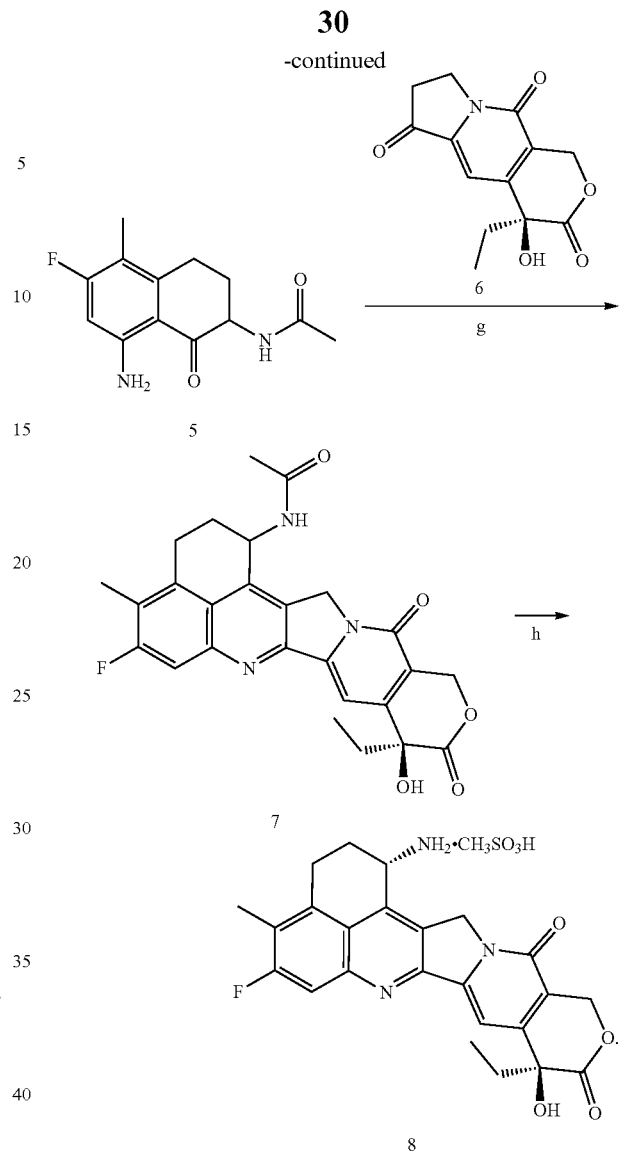

7. The preparation method according to claim 6, wherein in the step of e (i), the oximation agent is a nitrite, which is one or more selected from amyl nitrite, n-butyl nitrite, and tert-butyl nitrite; the base is potassium tert-butoxide.

8. The preparation method according to claim 6, wherein in the step of g, Compound 5 is subjected to the condensation reaction with Compound 6 in the presence of pyridinium p-toluenesulfonate and toluene to obtain Compound 7.

9. The preparation method according to claim 6, wherein in the step of h, Compound 7 is subjected to the hydrolysis reaction in the presence of methanesulfonic acid and water to obtain exatecan mesylate of formula 8.

10. The preparation method according to claim 1, wherein a molar ratio of Compound A to the catalyst is 1:(0.1-0.5).

11. The preparation method according to claim 1, wherein a molar ratio of Compound A to the oxidant is 1:(2-5).

12. The preparation method according to claim 1, wherein a volume ratio of the organic solvent to water is 1:(0.9-2).

13. A preparation method of exatecan mesylate represented by formula 8,

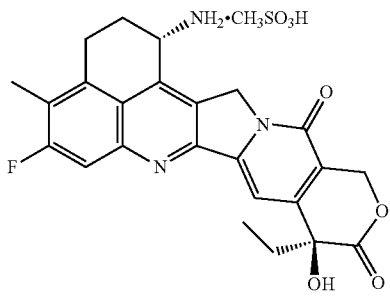

(8)

comprising preparing exatecan mesylate represented by formula 8 from a compound represented by formula A:

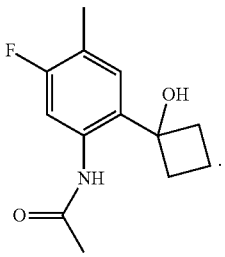

(A)

14. The preparation method according to claim 13, comprising the step of:
   d, subjecting Compound A to a rearrangement reaction to obtain Compound B,

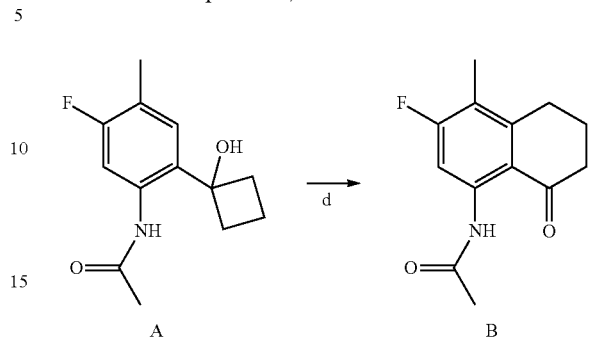

15. The preparation method according to claim 6, wherein in the step of e (ii), the acid is hydrochloric acid; the catalyst is palladium carbon.

16. The preparation method according to claim 6, wherein in the step of e (iii), the protecting group is acetyl group.

17. The preparation method according to claim 16, wherein the condensation reaction is a reflux reaction.

* * * * *